United States Patent [19]
Birchak et al.

[11] Patent Number: 5,726,951
[45] Date of Patent: Mar. 10, 1998

[54] STANDOFF COMPENSATION FOR ACOUSTIC LOGGING WHILE DRILLING SYSTEMS

[75] Inventors: James Robert Birchak, Spring; Eugene Joseph Linyaev; John Wesley Minear, both of Houston; Carl Arthur Robbins, Tomball; Bruce Mackie, Houston, all of Tex.

[73] Assignee: Halliburton Energy Services, Inc., Houston, Tex.

[21] Appl. No.: 430,822

[22] Filed: Apr. 28, 1995

[51] Int. Cl.⁶ .................................... G01V 1/40
[52] U.S. Cl. .................. 367/38; 367/50; 181/102; 181/105
[58] Field of Search ................... 367/38, 50, 51, 367/35; 181/102, 105

[56] References Cited

U.S. PATENT DOCUMENTS

| | | | |
|---|---|---|---|
| 5,081,611 | 1/1992 | Hornby | 367/25 |
| 5,250,806 | 10/1993 | Rhein-Knudsen et al. | 250/254 |
| 5,354,956 | 10/1994 | Orban et al. | 181/105 |
| 5,513,528 | 5/1996 | Holenka et al. | 73/151 |

Primary Examiner—J. Woodrow Eldred
Attorney, Agent, or Firm—Conley, Rose & Tayon

[57] ABSTRACT

A standoff compensation system is disclosed for use in an acoustic LWD system. An acoustic transducer is provided to measure the standoff distance between the logging tool and the borehole wall. The present invention includes a downhole processor for determining an index value which is used to align received acoustic formation signal measurements based upon the measured standoff distance. The index value can either be calculated by the downhole processor or can be retrieved from a pre-calculated look-up table in ROM. The processor then shifts the received acoustic formation signals based upon the index value assigned to each formation signal. The aligned acoustic formation signals are stacked, so that a single acoustic formation signal can be obtained for each firing period and either stored in downhole memory, used immediately, or transmitted by telemetry to the surface. The firing of the acoustic formation transmitters occurs in a rapid firing mode, followed by a relatively long idle. The rapid firing mode further minimizes the amount of data which must be stored, while providing an idle period for aligning and stacking the received signals.

27 Claims, 8 Drawing Sheets

FIG. 1A — RAW DATA

FIG. 1B — PEAK ALIGNED

| 1 51 | 1 200 | 1 200 |
| STANDOFF | RAW DATA | STANDOFF ALIGNED |

STANDOFF COMPENSATION FOR ACOUSTIC LOGGING WHILE DRILLING SYSTEMS

BACKGROUND OF THE INVENTION

The present invention relates generally to a system for determining formation characteristics during the drilling of a well. More particularly, the present invention relates to a system for increasing the accuracy of measurements made using acoustic sensors downhole. Still more particularly, the present invention relates to a improved measurement system for determining tool displacement or "standoff" of the acoustic transducers from the borehole wall, to permit the acoustic measurements to be processed to correct anomalies which arise because of transducer standoff.

Modern petroleum drilling ad production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a driller regarding the particular earth formation being drilled. In conventional oil well wireline logging, a probe or "sonde" is lowered into the borehole after some or all of the well has been drills, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole, as the sonde is pulled uphole.

The sensors used in a wireline sonde usually include a source device for transmitting energy into the formation, and one or more receivers for detecting the energy from the formation. Various sensors have been used to determine particular characteristics of the formation, including acoustic sensors, nuclear sensors, and electrical sensors. See generally J. Lab, *A Practical Introduction to Borehole Geophysics* (Society of Exploration Geophysicists 1986); D. R. Skinner, *Introduction to Petroleum Production*, Volume 1, at 54–63 (Gulf Publishing Co. 1981). Acoustic sensors commonly are used to measure the travel time of acoustic waves through the formation rock. The speed of sound through rock is influenced by the porosity of the rock. Consequently, acoustic logs are used as an indication of porosity. Acoustic logs also may be used to determine formation lithology, density, the elastic constants of subsurface materials, and the detection and orientation of fractures, among other things.

As one skilled in the art will understand, an acoustic wave transmitter used in a wellbore typically will generate compressional waves, shear waves, and other types of waves when the acoustic transmitter is actuated. In acoustic logging tools, it is customary to measure the velocity of the compressional wave or shear wave through formations. A conventional compressional wave logging system, for example, includes a cylindrical logging sonde that is suspended in the borehole, with one or more transmitters in the sonde for generating compression waves. The compression wave is refracted in the formation surrounding the borehole and propagates through a portion of the formation surrounding the borehole. The acoustic wave is refracted back into the borehole by the formation, where it is detected by two or more receivers in the sonde. The ratio of the distance d between the two detectors, to the time t between the detection of the compression wave, gives the compression wave velocity v of the formation. Examples of various acoustic logging tools are shown in U.S. Pat. Nos. 3,593,255, and 4,649,526.

While wireline logging is useful in assimilating information relating to formations downhole, it nonetheless has certain disadvantages. For example, before the wireline logging tool can be run in the wellbore, the drill string must first be removed or tripped from the borehole, resulting in considerable cost and loss of drilling time for the driller (who typically is paying daily fees for the rental of drilling equipment). In addition, because wireline tools are unable to collect data during the actual drilling operation, drillers must make some decisions (such as the direction to drill, etc.) without sufficient information, or else incur the cost of tripping the drill string to run a logging tool to gather more information relating to conditions downhole.

More recently, there has been an increasing emphasis on the collection of data during the drilling process. By collecting and processing data during the drilling process, without the necessity of tripping the drilling assembly to insert a wireline logging tool, the driller can make accurate modifications or corrections, as necessary, to optimize performance. Designs for measuring conditions downhole and for locating the drilling assembly contemporaneously with the drilling of the well have come to be known as "measurement-while-drilling" techniques, or "MWD." Similar techniques, concentrating more on the measurement of formation parameters, commonly have been referred to as "logging while drilling" techniques, or "LWD." While distinctions between MWD and LWD may exist, the terms MWD and LWD often are used interchangeably. For the purposes of this disclosure, the term LWD will be used with the understanding that the term encompasses both the collection of formation parameters and the collection of information relating to the movement and position of the drilling assembly.

The measurement of formation properties during drilling of the well by LWD systems increases the timeliness of measurement data and, consequently, increases the efficiency of drilling operations. The measurement of formation properties during drilling, however, spawns problems not present during traditional logging operations. As a result, certain logging techniques have not been used widely in logging while drilling systems. One of those techniques not typically used in LWD applications is acoustic or sonic logging. Acoustic sensors have not been used in LWD systems, in part, because of the difficulty in processing the received acoustical signal in the presence of ordinary drilling noise. Recently, however, acoustic measurements have been used as part of an LWD system by the assignee and others to provide formation data to assist in characterizing formation properties.

Figure 1A:
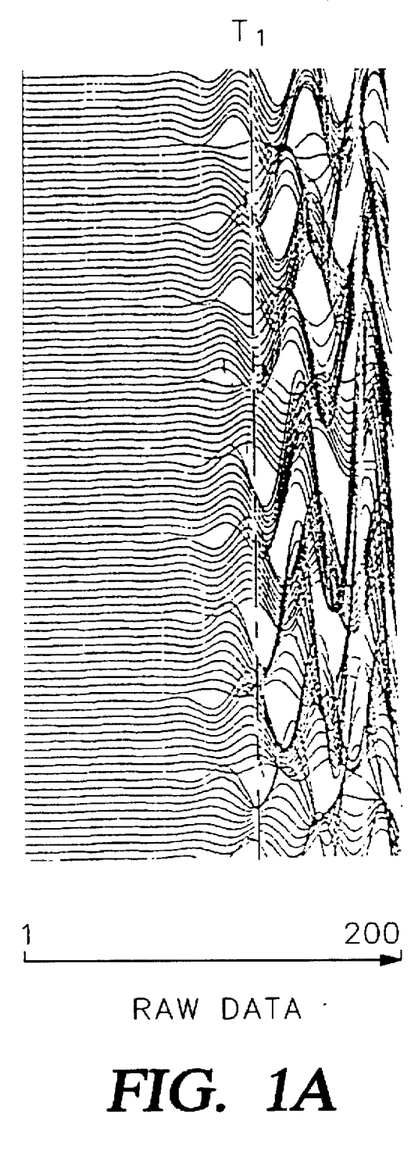
FIGS. 1A–1B depict logs currently generated by an acoustic LWD system.
Figure 1B:
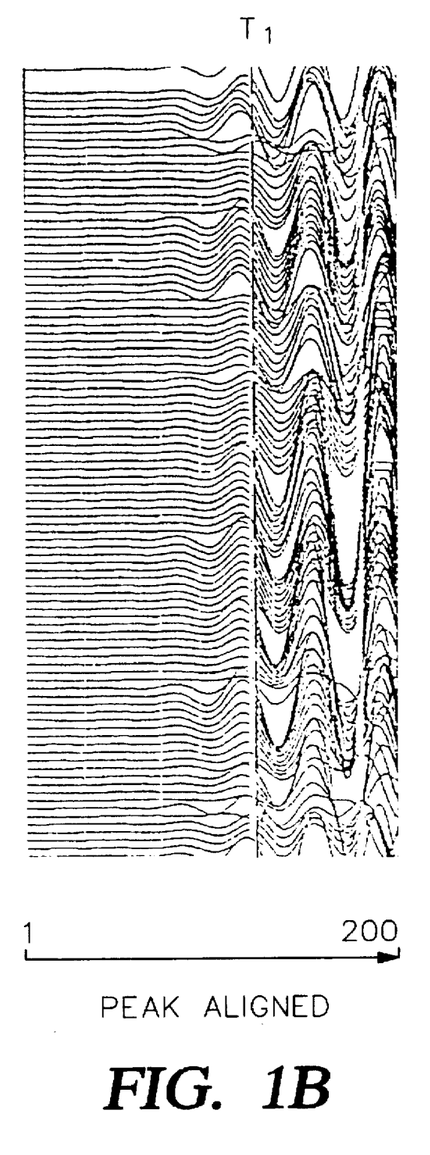

In addition to the problem with noise, the accuracy of acoustic measurements in LWD systems also has been limited by anomalies and inconsistencies between readings. While these inconsistencies and anomalies can be minimized with processing, the validity of the processing is questionable without a thorough understanding of the cause of these anomalies. An example of the raw data received by the acoustic receivers in an acoustic logging system is shown for purposes of illustration in FIG. 1A. As shown in FIG. 1A, the time between the detection of acoustic refractions varies, so that at time t, peak refractions are shown at certain times (or depths), while subsequent readings show a trough at the same time. Currently, all sonic readings are stored in memory and typically are only used after retrieval at the surface. When the readings are retrieved at the surface, processing is performed as shown in Figure 1B, to remove the anomalies in the signals by aligning the peaks in the raw data to provide uniformity between readings. The problem with this peak alignment technique is that there is no method available to validate the alignment. Consequently, the peaks may be misaligned, thereby making the resulting log inaccurate. In addition, requiring the acoustic readings to be stored, retrieved and processed greatly reduces the potential benefits which result from the recovery or use of real-time formation values. Further, requiring the storage of all sonic values requires a large quantity of memory downhole. To date, no one has developed a valid technique to correlate LWD acoustic readings, such as those shown in FIG. 1A, with a minimal use of memory.

Figures 1C, 1D:
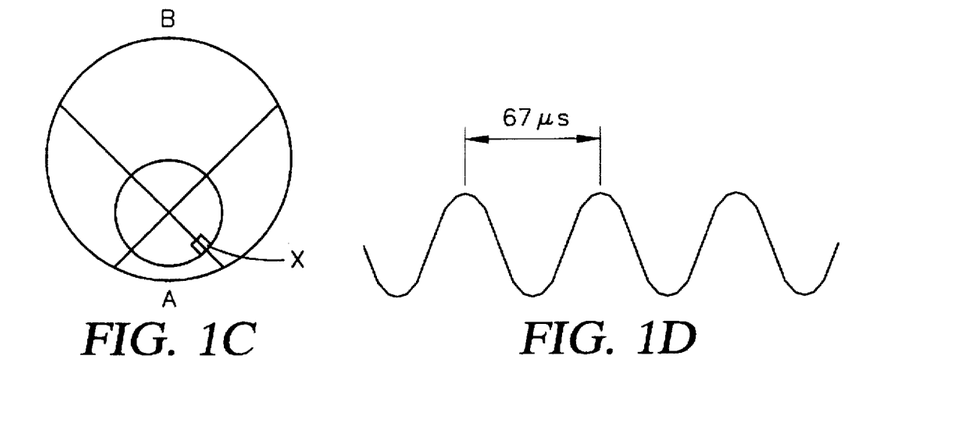
FIG. 1C illustrates the formation area measured by the acoustic sensors as the logging tool rotates.
FIG. 1D shows a period for a wave with a 15 kHz frequency.

The inventors herein have recently discovered that the inconsistencies between the acoustic readings are created by transducer displacement variations as drilling ensues. During drilling, the position of the acoustic transducers with respect to the borehole wall constantly changes. Referring to FIG. 1C, the LWD tool may "walk" within the borehole during drilling. In addition, as the drillstring rotates, the transmitter/receiver array (aligned along the circumference of the tool at point X) also rotates to face in different directions. Because the distance that the acoustic transducers are displaced from the borehole wall varies during drilling, the acoustic measurements may be skewed as the displacement or standoff varies between the acoustic transducers and the borehole wall. Thus, a first time of flight measurement made with a very small displacement (for example, transducers facing toward direction A in FIG. 1C) varies relative to the time of flight measurement made when the transmitter and receiver have a larger displacement from the borehole wall (as, for example, when the transducers face toward direction B in FIG. 1C). If the displacement of the transmitter and receiver from the wall of the wellbore is one inch, the speed of sound in the drilling mud is 17 microseconds per inch, and the acoustic signal has a frequency of 15 kHz, then the time-of-flight will be approximately 34 microseconds longer for a measurement with a one inch transducer displacement, then one made when there is no displacement. The 15 kHz acoustic wave has a period of approximately 67 microseconds, as shown in FIG. 1D. The 34 microsecond delay means that the received acoustic wave will be shifted approximately one half of its period. Consequently, a log generated with no displacement at 15 kHz will be 180° out of phase with a log generated with a one inch displacement. This explains the anomalies shown in FIG. 1A, in which adjacent readings appear to be almost 180° out of phase.

In wireline applications, displacement devices are used which force the sonde against the borehole wall, or which centralize the sonde, to provide a constant standoff distance. See U.S. Pat. Nos. 3,023,507 and 4,047,027. In LWD systems, however, forced displacement is not a viable option, although in some instances full gauge stabilizers have been used to increase the accuracy of the certain measurements. Full gauge stabilization systems have included arrangements to permit detectors to be mounted in the fins of stabilizers to minimize standoff distance and to eliminate the effects of drilling fluids on the measurements. See U.S. Pat. Nos. 5,250,806 and 4,879,463. Full gauge stabilization, however, is impractical in many conventional drilling applications, particularly when the bottomhole assembly is steered according to the techniques disclosed in commonly assigned U.S. Pat. No. 4,667,751. Unaccounted for motion of an LWD tool implementing acoustic based measurement systems results in a measurement response which is, at best, an average, with distances varying between the formation and the sensors for each measurement, resulting in measurements with poor sensitivity to the formation properties.

Standoff transducers and caliper devices have been used with certain LWD tools to determine displacement of the logging tool from the wall of the wellbore. They have not been used, however, with acoustic logging devices. The assignee of the present invention, for example, has developed a standoff transducer and caliper device for use with nuclear density measurements. See U.S. patent application Ser. No. 08/219,062, entitled "Standoff Compensation for Nuclear Logging While Drilling Systems." As disclosed in more detail in this commonly-assigned application, these standoff compensation systems are designed for use in an LWD system implementing gamma density and/or neutron porosity sensors. An acoustic transducer is provided to measure the standoff distance between the logging tool and the borehole wall. As disclosed in the aforementioned application, a downhole processor is provided for determining a weighting factor for the density and/or porosity measurements based upon the measured standoff distance. The weighting factor can either be calculated by the downhole processor according to a predetermined weighting function, or can be retrieved from a precalculated look-up table in ROM. The processor then multiplies the weighting factor by the count data from the sensor to determine a weighted count value. Examples of other standoff or caliper systems are described in U.S. Pat. Nos. 5,091,644, 5,175,429.

Despite the common use of standoff transducers with nuclear LWD tools, to date no one has attempted to use a standoff transducer to compensate for the anomalies which occur when acoustic LWD tools have been used.

SUMMARY OF THE INVENTION

The present invention solves the shortcomings and deficiencies of the prior art by implementing a standoff compensation system with an acoustic LWD system. A downhole processor is provided as part of the acoustic LWD system that receives information relating to standoff distance from a standoff sensor, and which uses this information to shift the time-of-flight signals from the acoustic receivers to correct for standoff of the transducers from the borehole wall. In addition to correcting or correlating the acoustic logs, the standoff transducer also provides information regarding the condition of the borehole in the vicinity of the acoustic LWD tool, and the ability of the formation to be penetrated by acoustic waves.

In a preferred embodiment of the present invention, acoustic transmitters and receivers are aligned along the same side of the tool. In this embodiment, an acoustic transmitter is positioned at the top of the transmitter/receiver array, with four acoustic receivers spaced consecutively below the transmitter. A transmitter is placed below the receivers, to provide a symmetrical array. In the preferred embodiment, a standoff transducer is centered in the transmitter/receiver array, along the same side of the tool, to produce an average standoff value for each of the transmitter and receiver transducers. The standoff transducer generates a collimated beam that is directed substantially perpendicularly to the longitudinal axis of the tool. The standoff transducer then receives the acoustic signal refracted back from the borehole wall. Supporting electronics are provided with the standoff transducer to produce a time-of-flight signal (i.e., the time between firing and receiving the acoustic beam) for the standoff transducer. Because the properties of the drilling mud are known, and thus the velocity of sound through the mud is known, the standoff distance or displacement can be calculated with a relatively high degree of precision.

The standoff distance then preferably is used either downhole or at the surface to process and correlate the acoustic logs produced from the acoustic receivers. In particular, the individual acoustic logs are shifted based upon the standoff distance that existed when the acoustic log was taken to eliminate the inconsistencies introduced by standoff. Thus, by using the standoff values, the acoustic logs can be correlated in a valid and consistent manner.

In the preferred embodiment, a rapid firing technique is used for the acoustic transmitters and receivers in which many readings are taken in a relatively brief interval (such as 10 firings in 200 microseconds), followed by a relatively long idle period during which no readings are taken (such as 20 seconds). The use of the rapid firing technique insures that the formation in the vicinity of the acoustic LWD tool remains relatively constant, because the penetration of the bit is minimal in 200 microseconds. As a result, the signals received during the 10 firings can be summed and averaged (or stacked) to produce a single signal to represent the 10 signals produced in the rapid firing interval. In addition, the idle period reduces the number of readings which must be stored in memory downhole, while also providing a sufficient time period during which the signals can be immediately processed.

In an exemplary embodiment of the invention, a downhole processor is included as part of the LWD system to shift the acoustic logs based upon the standoff distance. After shifting, the processor then "stacks" all of the shifted and correlated values taken during a rapid fire period to produce a single average log value for that firing period. This single normalized value is the only value stored, together with an average standoff value. By processing the acoustic log downhole in this manner, a massive amount of memory storage space is conserved. In addition, by distilling the acoustic log in this manner, it also is possible to transmit data reflecting the content of the acoustic log during drilling using conventional mud pulse technology to provide real-time data to the driller. Alternatively, the ability to process the acoustic logs downhole means that bed boundaries can be detected by the downhole processor and can be used as part of a "Smart" system to automatically maintain the drill bit in the pay zone. Such a system can be implemented through the use of an adjustable stabilizer, as described in U.S. Pat. No. 5,332,048.

Once the processed and stacked acoustic log values are retrieved, additional processing can be performed on the logs to correlate different firing periods. Once again the average standoff values for each firing period are used to correlate each of the different firing periods to produce a log which eliminates the anomalies created by transducer displacement. After correlation, further processing of the acoustic logs is possible to gain additional information regarding the characteristics of the downhole formations.

In the preferred embodiment, the standoff alignment is done simultaneously with stacking through the use of indexing. Each point in the received signal is assigned an index value, based upon the standoff measured when the signal was received. The points in each received signal with the same index values then are summed together during stacking.

BRIEF DESCRIPTION OF THE DRAWINGS

For a more detailed description of the preferred embodiment of the present invention, reference will now be made to the accompanying drawings, wherein.

During the course of the following description, the terms "upper," "above," "below," and "under" are used to identify the relative position of components in the bottom hole assembly, with respect to the distance to the surface of the well, measured along the borehole path.

DETAILED DESCRIPTION OF THE PREFERRED EMBODIMENT

Figure 2:
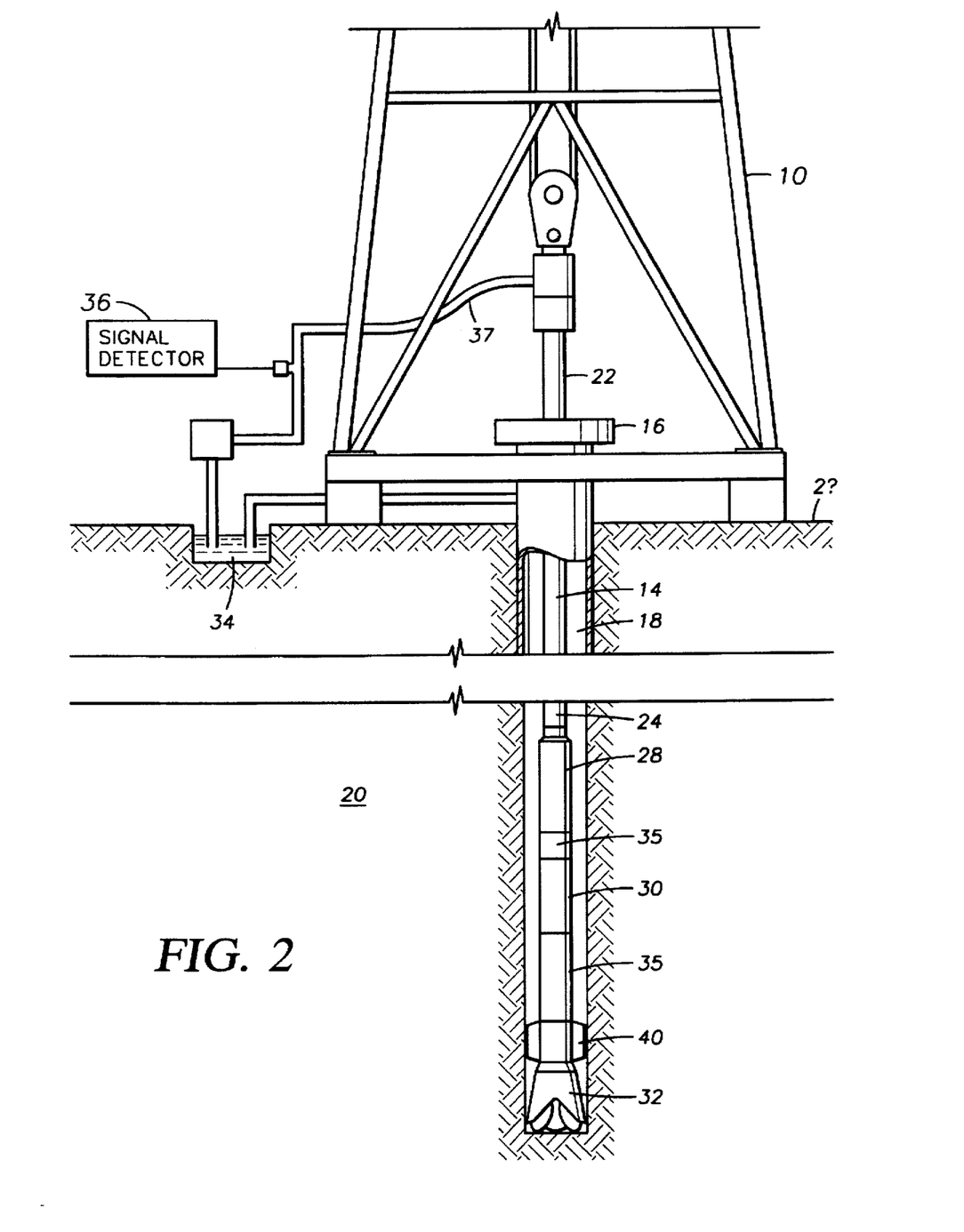
FIG. 2 is a schematic elevation of a drilling assembly implementing an acoustic LWD system in accordance with the present invention.

Referring now to FIG. 2, a typical drilling installation is illustrated which includes a drilling rig 10, constructed at the surface 12 of the well, supporting a drill string 14. The drill string 14 penetrates through a rotary table 16 and into a borehole 18 that is being drilled through earth formations 20. The drill string 14 includes a kelly 22 at its upper end, drill pipe 24 coupled to the kelly 22, and a bottom hole assembly 26 (commonly referred to as a "BHA") coupled to the lower end of the drill pipe 24. The BHA 26 typically includes drill collars 28, a LWD system 30, one or more stabilizer(s) 40, and a drill bit 32 for penetrating through earth formations to create the borehole 18. In operation, the kelly 22, the drill pipe 24 and the BHA 26 are rotated by the rotary table 16. The drill collars are used, in accordance with conventional techniques, to add weight to the drill bit 32 and to stiffen the BHA 26, thereby enabling the BHA 26 to transmit weight to the drill bit 32 without buckling. The weight applied through the drill collars to the bit 32 permits the drill bit to penetrate underground formations.

As the drill bit 32 operates, drilling fluid or mud is pumped from a mud pit 34 at the surface through the kelly hose 37, into the drill pipe, to the drill bit 32. After flowing through the drill bit 32, the drilling fluid rises back to the surface through the annular area between the drill pipe 24 and the borehole 18, where it is filtered and returned to the mud pit 34. The drilling fluid is used to lubricate the drill bit 32 and to remove cuttings from the borehole 18. As one skilled in the art will realize, a downhole motor or turbine 55 may be used downhole to rotate the drill bit 32 as an alternative, or in addition to, rotating the drill string from the surface. Current rotation rates for the drill string are on the order of 90–120 revolutions per minute.

Figure 3:
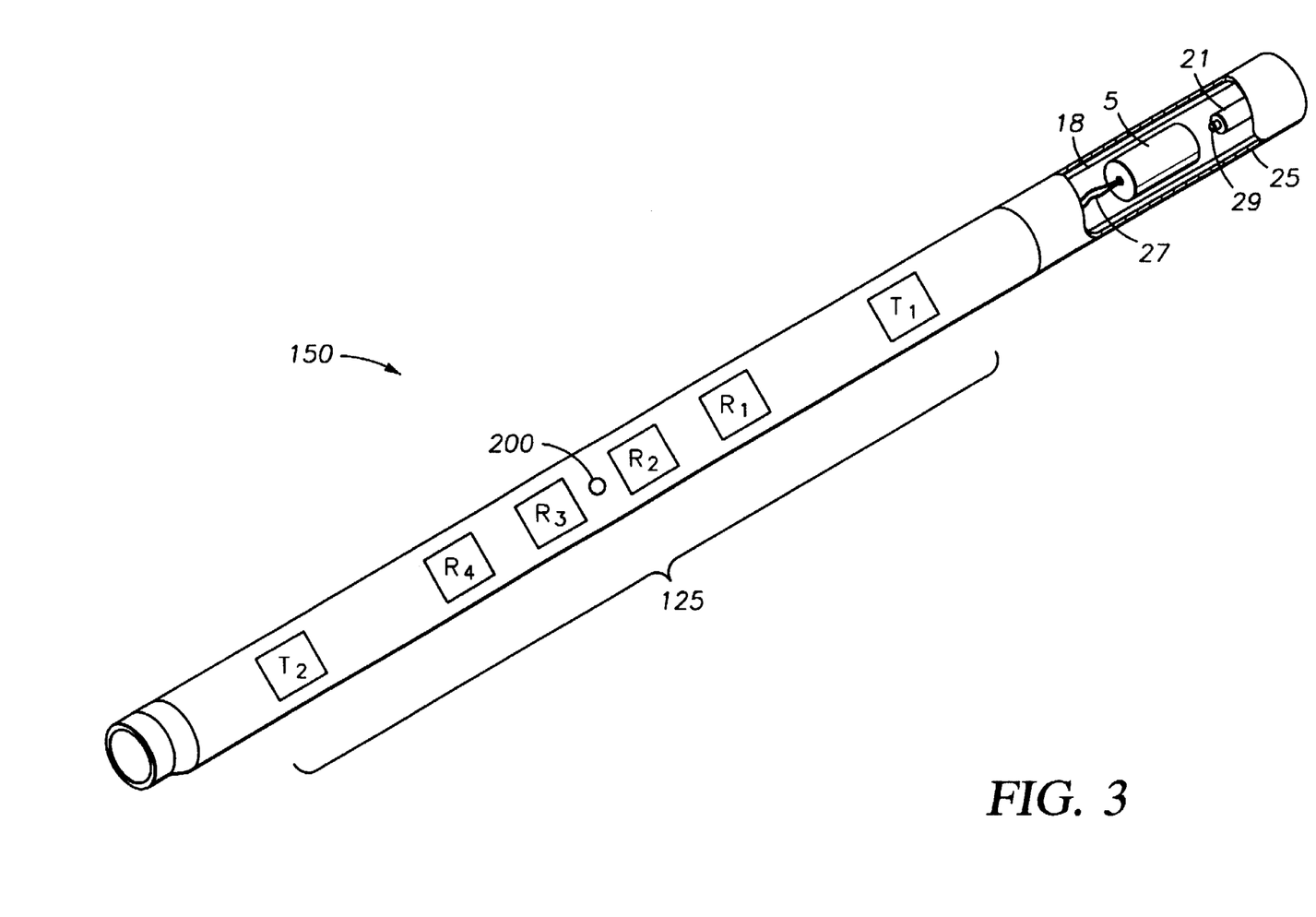
FIG. 3 is a perspective view of an acoustic LWD tool implementing an acoustic standoff compensation system in accordance with the preferred embodiment.
Figure 4:
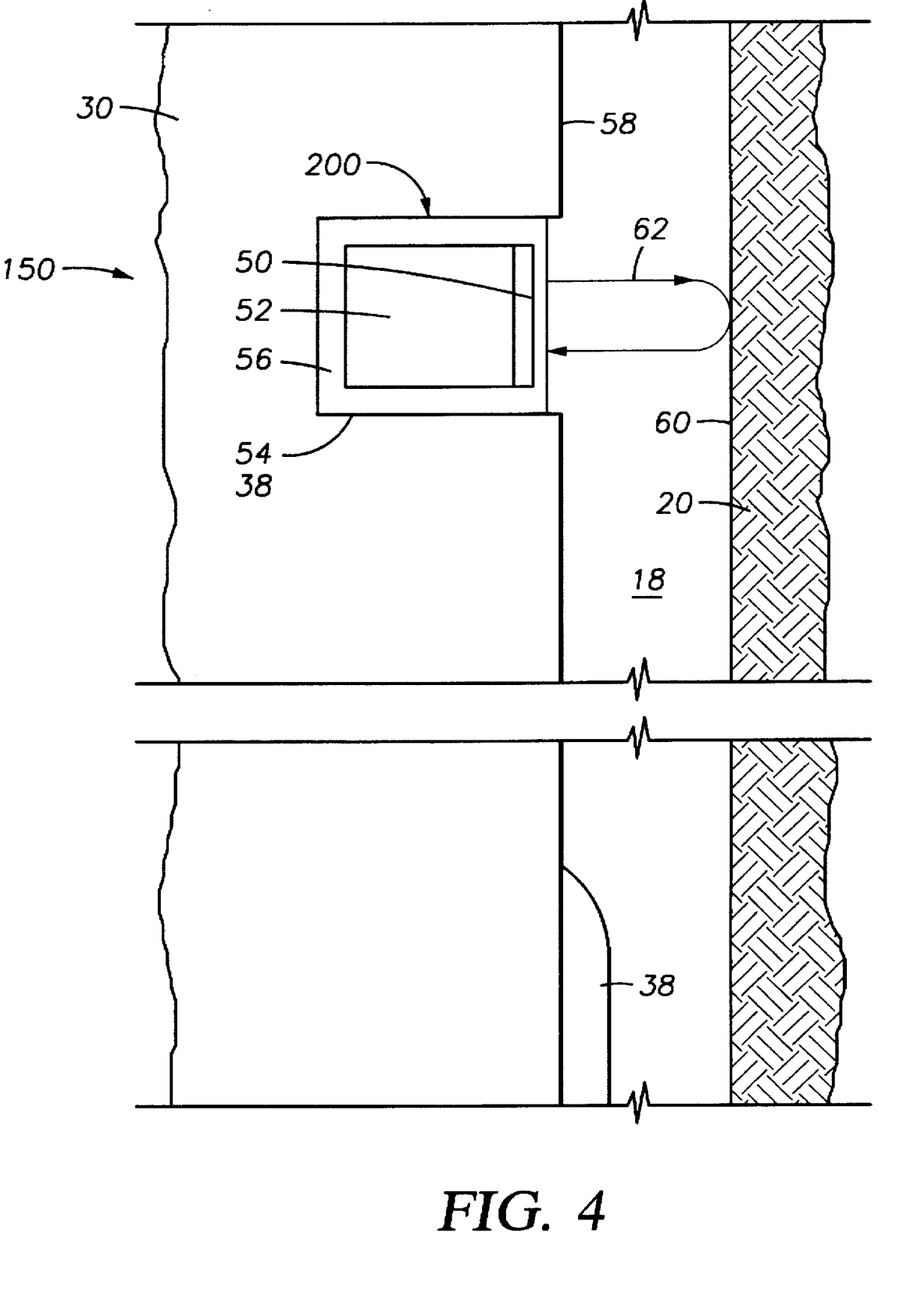
FIGS. 4 is a sectional view of the acoustic transducer, depicting the path of the ultrasonic signal emanating from the transducer.

The LWD system 30 preferably is located as close to the bit 32 as practical. It should be understood that the LWD system 30 may be considered part of the drill collar section 28. Signals representing measurements of borehole dimensions and drilling parameters are generated and stored downhole, as will be described more fully below. In addition, some or all of the signals also may be routed through a communication assembly 35 (such as a conventional mud pulse encoding device) in the drill string 14 to a control unit 36 at the earth's surface 12, where the signals are processed and analyzed. The communication of the signals from the LWD system 30 to the control unit 36 preferably is accomplished through the use of known telemetry systems, and therefore will not be discussed in detail herein. Referring now to FIGS. 3 and 4, the LWD system 30 constructed in accordance with the preferred embodiment may include a number of detecting and sensing devices. Only the acoustic or sonic portion of the LWD system 30 will be discussed herein. As best shown in FIG. 3, the LWD acoustic tool 150 preferably has a generally tubular configuration which houses an acoustic transmitter/receiver array 125 and a standoff transducer 200. The transmitter/receiver array preferably includes a plurality of acoustic transmitters $T_1$, $T_2$, and a plurality of acoustic receivers $R_1$, $R_2$, $R_3$, and $R_4$, all of which are aligned along the same longitudinal position along the circumference of the tool 150. In the preferred embodiment, and as shown in FIG. 3, the transmitter $T_1$ is located at the upper end of the tool 150. Receivers $R_1$, $R_2$, $R_3$, and $R_4$ are spaced below the transmitter $T_1$. The second transmitter $T_3$ is positioned below the receiver array. The spacing between the transmitters and receivers is a function of the operational frequency of the transmitters, as will be understood by one skilled in the art. Operating frequencies for the transmitters $T_1$, $T_2$, range from 8 kHz to 20 kHz, with 10 kHz–15 kHz considered the optimal range.

In accordance with the preferred embodiment of the present invention, the LWD acoustic tool 150 also preferably includes an acoustic sensor 200 for determining standoff distance between the logging tool and the borehole wall. In the preferred embodiment, the standoff transducer 200 is positioned at the approximate midpoint of the transmitter/receiver array, between receivers $R_2$ and $R_3$.

Referring now to FIGS. 3 and 4, the transducer 200 preferably is positioned on the outer circumference of the tool 150 and is aligned with the acoustic transmitter/receiver array 125. As described in J. R. Birchak, et al. "Standoff and Caliper Measurements While Drilling Using a New Formation-Evaluation Tool with Three Ultrasonic Transducers", presented at the 68th Annual Technical Conference and Exhibition of the Society of Petroleum Engineers held in Houston, Tex. on Oct. 3–6, 1993, the teachings of which are incorporated by reference herein, the present invention can be implemented with multiple transducers. Additional transducers are required, however, only if the present invention is also to be used to obtain caliper and borehole measurements. The transducer 200 preferably comprises a pulse/echo transducer, which functions both as a transmitter and receiver. The transducer 200 produces a collimated beam in a direction normal to the LWD tool 150. The operating frequency of the transducer 200 preferably ranges between 100 kHz–350 kHz, with 250 kHz considered optimal.

The transducer 200, in accordance with the present invention, preferably is axially aligned with the acoustic transmitters $T_1$, $T_2$, and receivers $R_1$, $R_2$, $R_3$, $R_4$ to provide standoff distances for aligning the raw data received by the acoustic receivers $R_1$, $R_2$, $R_3$, $R_4$. As best seen in FIG. 4, the transducer 200 is preferably partially housed in the tool 150. Like the standoff transducer described in commonly assigned U.S. patent Ser. No. 08/219,062, the transducer 200 preferably includes a piezoelectric crystal 50 and a tungsten loaded backing 52, which preferably attaches to the interior surface of crystal 50. The crystal and backing preferably are encapsulated in epoxy 56 to form transducer 200, which preferably mounts within a recess 54 machined in the tool 150. As best seen in FIG. 4, when positioned in the borehole 18, the transducer 200 is recessed with respect to the tool periphery 58 on the order of 0.375", facing the borehole wall 60. The space between the tool periphery 58 and the borehole wall 60 represents the tool standoff at the depth and angular position where the transducer 200 is located at that instant in time. Normally, this space between the tool 150 and borehole wall 60 is filled with a flow of drilling fluid during drilling.

Figure 5A:
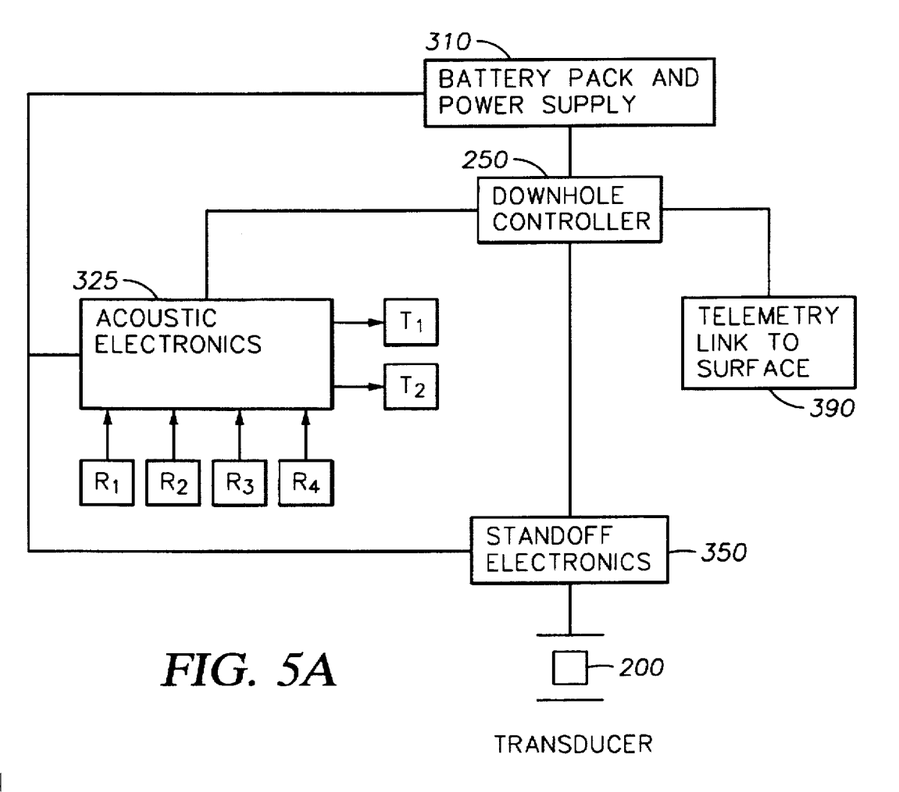
FIG. 5A is a block diagram of the system layout of the present invention in accordance with the preferred embodiment.

In operation, and referring now to FIGS. 4 and 5A, the piezoelectric crystal 50 preferably generates ultrasonic signals 62 in response to an electrical pulse from a voltage sensor, such as a battery 310 (FIG. 5A) in the preferred embodiment. This signal 62 travels through the drilling fluid surrounding the tool 150 and is reflected by the borehole wall 60. At least a portion of the ultrasonic signal 62 rebounds from the borehole wall 60 and is received by the piezoelectric crystal 50, which in turn converts the signal received into an electrical pulse. The arrival time of the signal thus received is recorded and a "time-of-flight" signal is generated by electronic circuitry, as described more fully below. The time-of-flight signal preferably is used to determine the standoff distance between the transducer 200 and the borehole wall 60.

The acoustic impedance of the epoxy layer 56 preferably is selected to optimize the transfer of acoustic energy into the mud. Also, the impedance of the backing 52 preferably is selected to match the impedance of the crystal 50, and functions to absorb the portion of the wave emitted from the back of the crystal 50. The backing also dampens the ringing that would otherwise persist in the crystal after transmission of the acoustic signal. To function properly, the damping must occur before the reflected waves are received by the crystal 50.

Referring now to FIG. 5A, the acoustic LWD tool 150, in accordance with the preferred embodiment, generally includes a battery pack and power supply unit 310, a formation evaluation controller 250 preferably located downhole, acoustic electronics 325 connected to the acoustic transmitters $T_1$, $T_2$ and acoustic receivers $R_1$, $R_2$, $R_3$, $R_4$, standoff electronics 350, connected to transducer 200, and telemetry device 390.

The battery pack 310 provides operating power to each of the electronic subassemblies in accordance with conventional techniques. The battery pack 310 typically is located in the LWD system 30 (FIG. 2), which may be remote from the acoustic LWD tool 150. Thus, for example, the battery pack 310 may be located in a separate section of drill collar, and connected electrically via cables or conductors to the circuitry located within the drill collar section housing the acoustic electronics.

The formation evaluation controller 250 preferably comprises a central processing unit 64 and a data memory 92, as will be discussed more fully with respect to FIG. 5B. The formation evaluation controller 250, in accordance with the preferred embodiment, receives output signals from the acoustic electronics 325, and the standoff electronics 350 to compute a compensated acoustic log which is aligned based upon the measured standoff distance.

The acoustic electronics 325 is constructed in accordance with conventional techniques and preferably includes the transmitter/receiver array which preferably comprises transmitters $T_1$, $T_2$ and receivers $R_1$, $R_2$, $R_3$, $R_4$, as discussed above in relation to FIG. 3. The acoustic electronics 325 develops borehole compensated acoustic logs representing the raw data received by the acoustic receivers. In the preferred embodiment, the acoustic electronics 325 actuates the acoustic transmitters in a rapid firing mode, by alternatively firing the transmitters several times in a relatively brief interval. Thus, for example, transmitters $T_1$ and $T_2$ may be each fired a total of 10 times in a period of 200 milliseconds. The transmitters then remain idle for a relatively long period (such as, for example, 20 seconds) before firing begins again. The duration of the firing may vary as necessary depending upon formation characteristics to ensure that each transmitted signal is received before the next firing occurs. Similarly, the idle period may vary depending on the rate of penetration and other drilling parameters. The idle period minimizes the amount of memory space required to store the received acoustic signals, and further, provides time for the controller 250 to process the signals received at the receiver array ($R_1$, $R_2$, $R_3$, $R_4$).

In the preferred embodiment, the controller 250 shifts the raw data received from the acoustic electronics 325 during the rapid firing period and then stacks the shifted signals into a single signal which provides an indication of the average acoustic value obtained by the logging tool 150 during the firing period. This average acoustic signal is stored in memory, together with certain other information, such as the average standoff distance and the time period of the readings. By storing the single averaged value, the amount of storage space consumed in memory is greatly reduced as compared to conventional systems. In addition, because this processing occurs downhole, this information can be used as an input to a smart closed loop drilling system 450 (FIG. 5B), as disclosed in U.S. Pat. No. 5,332,048, the teachings of which are incorporated herein. This processed information also can be sent via mud pulse signals to the surface.

The standoff electronics 350 will be discussed more fully with respect to FIGS. 3 and 5B. As shown in FIG. 3, the electronic circuitry 5 (including controller 250, acoustic electronics 325 and standoff electronics 350) preferably is located in a sub 25 positioned adjacent tool 150. Alternatively, some or all of this circuitry may be located in the LWD tool 150. The electronic circuitry 5 preferably is mounted within a pressure barrel 18 to prevent contamination, and connects to the logging sensors and transducer 200 through a conductor bundle 27. As shown in FIG. 3, the electronic circuitry 5 preferably is powered by a battery pack 310, to which it is connected by conductors 29.

Figure 5B:
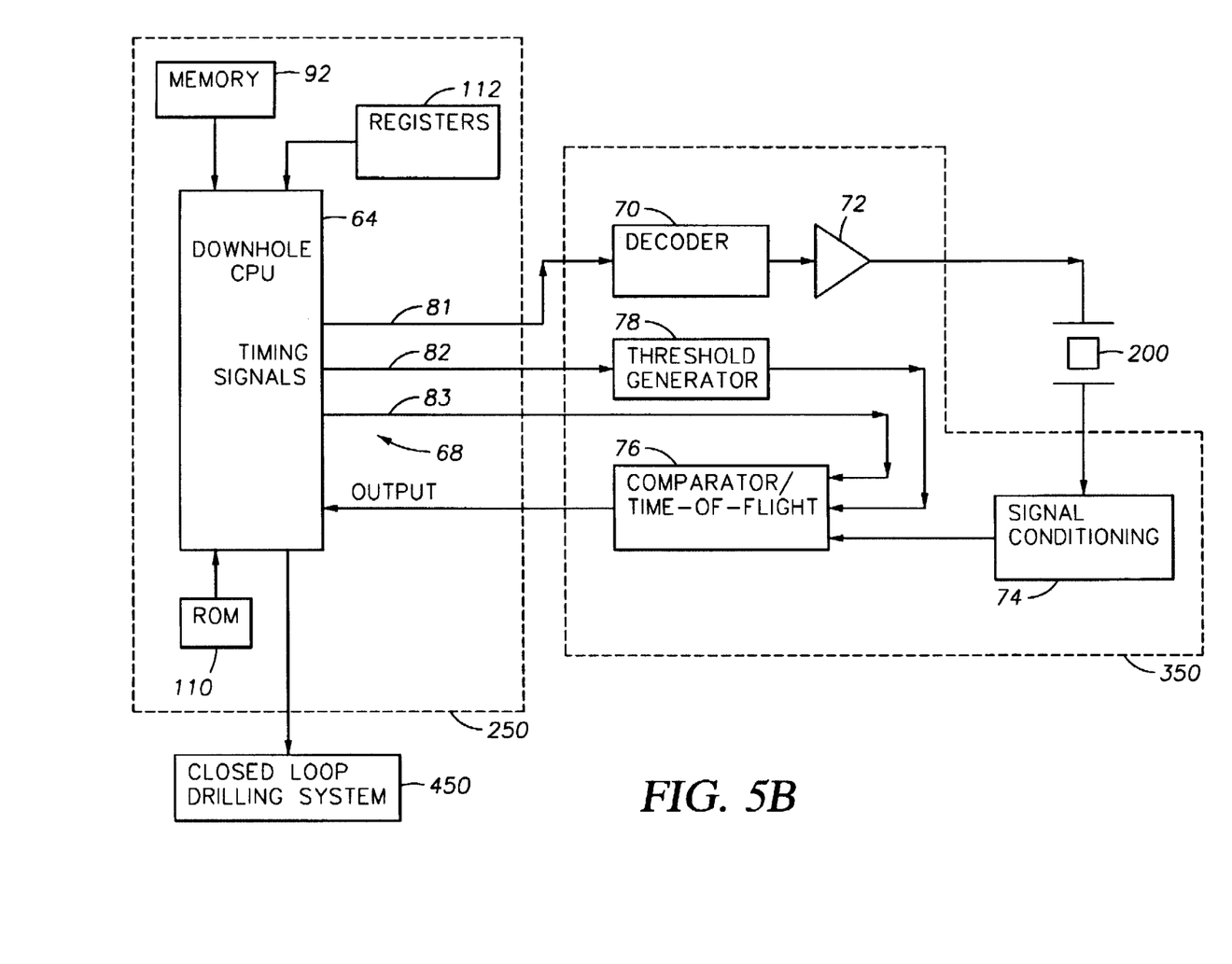
FIG. 5B is a block diagram for the electronic circuitry of the controller and standoff transducer of FIG. 5A.

Referring to FIG. 5B, the formation evaluation controller 250 and standoff electronics 350 preferably comprise a downhole processing unit 64 (referred to herein as "CPU," "processing unit" or "processor"), a transducer decoder 70, a threshold generator 78, a comparator 76, and data memory 92. The downhole processing unit 64 preferably is programmed in accordance with conventional techniques to generate an acoustic measurement of standoff distance every 20 milliseconds. As one skilled in the art will understand, the measurements can be taken more or less frequently as desired. The processor 64 generates a timing signal that is transmitted to the transducer decoder 70, the threshold generator 78 and the comparator 76.

Upon receipt of the timing signal from the central processing unit 64 on conductor 81, the transducer decoder 70 initiates the voltage pulse that is amplified by amplifier 72 and is transmitted to the transducer 200, causing it to fire. The transducer decoder 70 determines the magnitude and the width of the voltage pulse that is sent to the transducer 200. The pulse causes the transducer 200 to fire, producing an acoustic wave that is transmitted radially from the logging tool 150. Acoustic signals reflected by the borehole wall 60 (FIG. 4) are received by the transducer 200, which generates an electrical output signal that is amplified and filtered by signal conditioning circuitry 74. The conditioned output signals are applied on conductor 84 to the comparator 76. The second timing signal on line 82 is received by the threshold detector 78, and is used by the threshold detector 78 to determine the length of the wait period between the firing of the transducer 200 and the time at which reflected pulses can be accepted. The wait period is required to prevent false signals that would otherwise result from the ringing of the piezoelectric crystal. The third timing pulse is transmitted via conductor 83 to the comparator 76 and is used to start the time-of-flight measurement and limit its output range.

Figure 7:
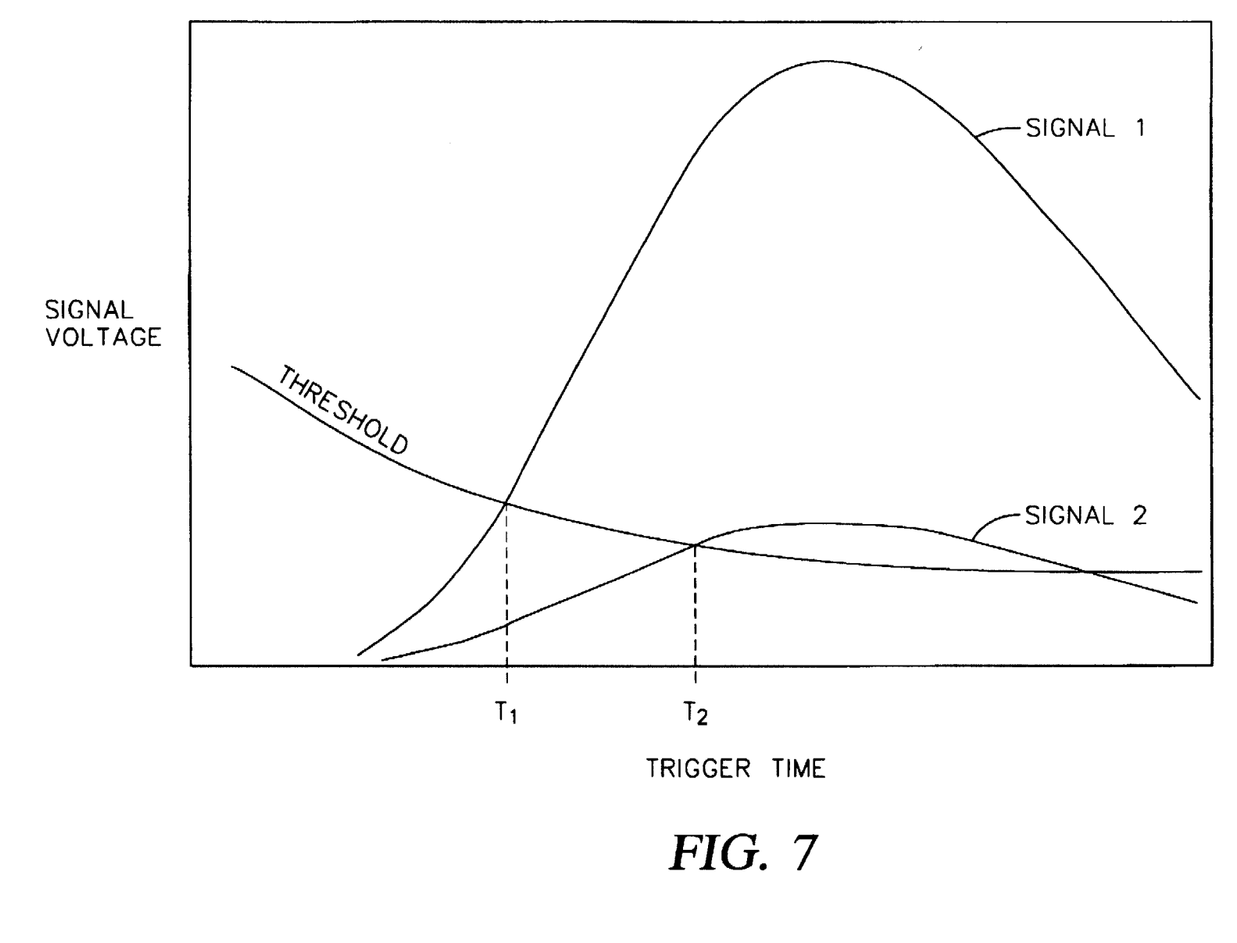
FIG. 7 is a graph illustrating the variation in the threshold triggering voltage with time, for the threshold generator of FIG. 5B.

After the wait period has expired, the amplitudes of the reflected pulses are compared in the comparator 76 with an electronic threshold established by the threshold generator 78 on conductor 86. Because the amplitude of the ultrasonic waves decreases with the distance travelled, and thus the time travelled, the threshold preferably decays exponentially with time, as shown for example in FIG. 7. This decaying of the threshold value provides the same sensitivity to all waves, regardless of the distance that the wave has travelled. If the received signal is greater than the threshold value, the comparator 76 calculates a time-of-flight value by counting the period between the time that a signal is received on line 83 from the processing unit, and the time that a signal is received from the transducer on line 84. An electrical signal indicative of the time-of-flight value preferably is transmitted to the central processing unit 64 on conductor 85, and is used by the CPU 64 to compute an index value for the acoustic data generated by acoustic electronics 325.

A memory unit 92 preferably is provided as part of the formation evaluation controller 250 that includes at least a one Mbyte storage capacity. The memory unit 92 stores measured and processed data for retrieval subsequently. In addition, a read only memory 110 ("ROM") preferably also is included as part of the formation evaluation controller 250 for storing certain basic input operating instructions for the CPU 64 in accordance with conventional techniques. The ROM 110 may also be used in an alternative embodiment to store index values in a look-up table. Status and control registers 112 also preferably are provided in accordance with conventional techniques to store control and status information for the formation controller.

The standoff distance S of transducer 200 may be determined according to the following formula:

$$S = \frac{v(t_{so} - t_0)}{2} - d \qquad (1)$$

where S is the standoff distance between the transducer 200 and the borehole wall 60;
v is the speed of sound (or acoustic velocity) in the drilling fluid;
d is the distance that the transducer is recessed in the mandrel of the logging tool 150;
$t_{so}$ is the time-of-flight measured for the acoustic wave; and
$t_0$ is the offset time reflecting the electronic delays of the circuitry and the time required for the acoustic wave to travel through the encapsulating epoxy.

The acoustic velocity v in the drilling fluid under actual conditions downhole can be measured dynamically according to certain known techniques. In the preferred embodiment, however, a value is assigned to the acoustic velocity v based on the borehole conditions, including the type of drilling fluid (water-based or oil-based), fluid weight, fluid salinity, temperature and pressure, all of which are known during a drilling operation. The manner of estimating the speed of sound in the drilling fluid can be accomplished by assembling equations for the known parameters to provide a reasonably accurate approximation. See generally M. Greenspan, et al. "Tables of the Speed of Sound in Water," *J. Acoust. Soc. Am.*, Vol. 31, NO. 1 (January 1959); C. C. Leroy, "Development of Simple Equations for Accurate and More Realistic Calculation of the Speed of Sound in Sea Water," *J. Acoust. Soc. Am.*, Vol. 46 (1969); A. L. Podio, et al. "Ultrasonic Velocity and Attenuation Measurements in Water-Based Drilling Muds," ASME Drilling Technology Symposium, PD Vol. 27 (Jan. 14–18, 1990). It has been determined that approximating a value for the acoustic velocity v based on these parameters is sufficiently precise for the purposes of the present invention. The offset time $t_0$ is determined in a tool calibration procedure conducted in accordance with conventional techniques prior to the use of the logging tool 150.

The standoff distance S(t) preferably is measured once for each sampling period Δt of the acoustic array 125, which preferably is approximately every 20 milliseconds during the firing period. Thus, if the logging tool 150 is rotating at 90 RPM and measurements are taken every 20 milliseconds during a 200 millisecond firing period, 10 measurements are made of the standoff distance in a rotation of 108° (where rotation angle=revolutions per second of the logging tool× duration of firing period in seconds×360°).

Figure 6:
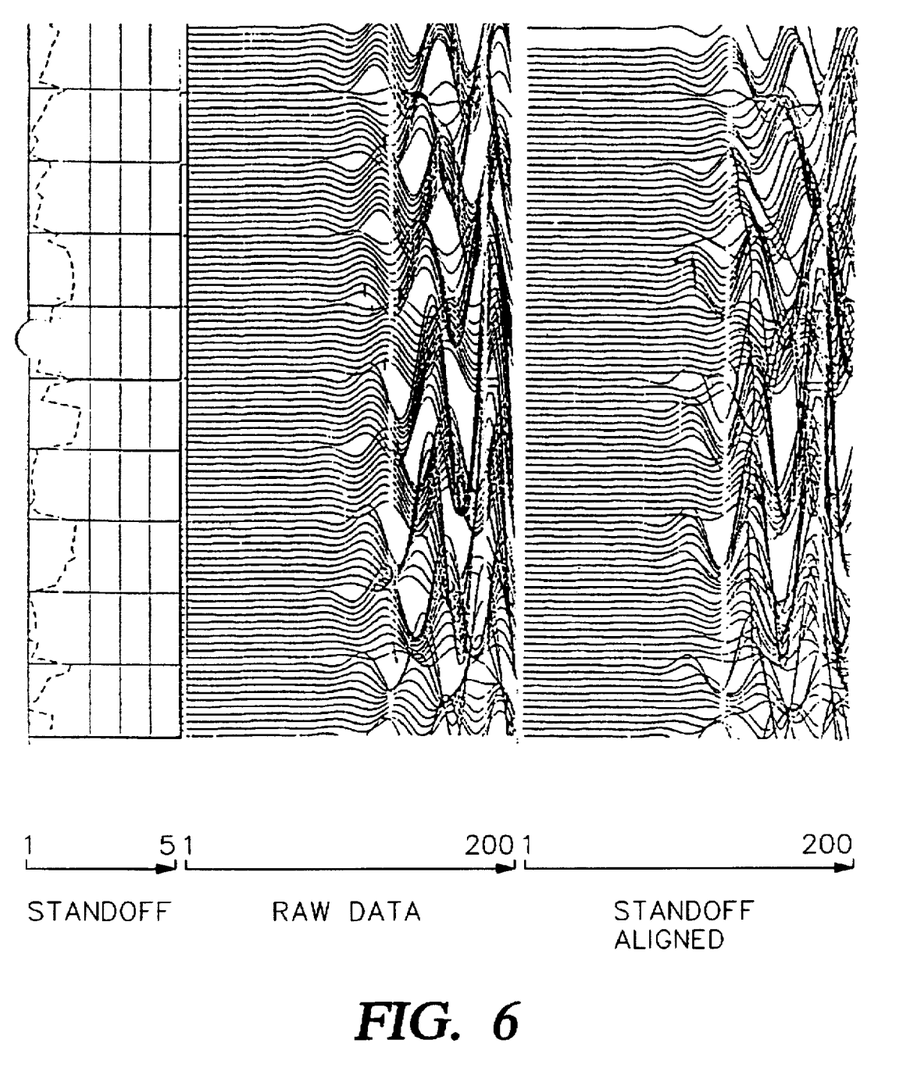
FIG. 6 depicts a log showing the standoff detected during acoustic logging, and the correction of the received raw data to reflect standoff alignment.

As shown in FIG. 6, the raw data obtained from the acoustic electronics is processed using standoff information to produce a standoff aligned acoustic signal. In the preferred embodiment, the standoff distance S(t), or time-of-flight period $t_{so}$, is used by the field evaluation controller 250 to provide an index value I to each of the received acoustic signals obtained by the acoustic electronics 325. The index value then is used to shift each received acoustic signal to align with a reference value for standoff. The aligned values can then be stacked in accordance with known techniques to provide a single acoustic signal for each firing period. The following example is provided for purposes of illustration, with the understanding that the present invention is not limited to the values chosen.

Initially, the index value I is determined by:

$$I = \frac{t_{so}}{\Delta t} \qquad (2)$$

where $t_{so}$ is the time-of-flight of acoustic wave 62 (FIG. 4) between the pulse and echo of transducer 200; and Δt is the sampling interval for the waveforms in FIG. 6.

In an exemplary embodiment, the time of flight for the standoff measurement ($t_{so}$) may vary between approximately 1 and 100 microseconds (for a 3 inch standoff). If the sampling interval is 1 microsecond, for example, then the index values I range from 1–100. A reference index value of 50 for a standoff time ($t_{so}$) of 50 microseconds might be used for standardizing the other acoustic signals.

The index value is used to align the received acoustical signals. If the first received signal has a time-of-flight of 33 microseconds, it would be assigned an index value of 33. Each sampled point in the first signal then would be shifted to the fight or delayed 17 sampling points to align with the reference standoff. Similarly, if the second acoustic signal has a time-of-flight of 75 microseconds (for an index value of 75), then this signal would be shifted to the left, or sped up, 25 sampling points to align with the reference standoff value. After all acoustic signals are aligned, the signals are stacked to produce a single signal representing an average value for the firing period. This signal can then be stored together with the average standoff distance (or time-of-flight) and certain other information. Alternatively, the values for each index element value I can be stored in a look-up table in read only memory (ROM) 110 (FIG. 5B) based upon the measured standoff time or distance. Thus, once the standoff is determined, a corresponding index value could be obtained from a look-up table in ROM 110. One skilled in the art will understand that any of the available types of ROM may be used in this invention.

After each of the stacked signals are computed, they preferably are stored in memory 92 downhole together with the date, the time, and the standoff value. In addition, some or all of this data can be transmitted to the surface by conventional telemetry techniques. After this information is received at the surface, additional processing can again be performed to obtain a log reflecting all acoustic data. Once again, it is preferred that this data be aligned based on standoff, by repeating the process as outlined above.

In addition to providing standoff information, the standoff transducer and downhole controller also can be used for other functions. For example, the standoff distances obtained from the standoff transducer can be compiled to obtain rough caliper measurements. In addition, if the amplitude of the standoff transducers signals are considered, the present invention also can provide a rudimentary borehole imaging device. The downhole controller can use the standoff distances to reject the formation investigatory acoustic signals if the standoff is deemed excessive, as may occur, for example, if there are borehole washouts, or the like. In addition, if the bottomhole assembly comprises a steerable assembly, the standoff transducer can advantageously be used to determine whether the tool is positioned properly during sliding modes. In horizontal wells, the drill collars and other BHA components will tend to lie on the bottom side of the borehole, with minimal standoff. The upper side of the BHA, conversely, will tend to have a rather large standoff. The standoff transducer therefore can be used in a horizontal well to determine whether the transmitter/receiver array is facing upwardly or downwardly, based upon the measured standoff.

While a preferred embodiment of the invention has been shown and described, modifications thereof can be made by one skilled in the art without departing from the spirit of the invention.

We claim:

1. A method for aligning acoustical signals from a downhole sensor in a logging tool based upon standoff distance from a borehole wall, comprising the steps of:
   (a) measuring standoff distance during a sampling interval;
   (b) shifting the acoustical signals based upon the measured standoff distance; and
   (c) stacking each acoustical signal to produce a single stacked signal representative of all the acoustical signals obtained during the sampling interval.

2. A method as in claim 1, further comprising the steps of:
   (d) repeating steps (a)–(c) for subsequent sampling intervals; and
   (e) aligning each of the stacked signals based on standoff.

3. A method as in claim 1, wherein the step of measuring standoff comprises the steps of:
   (a)(1) firing a transmitter rapidly during the sampling interval; and
   (a)(2) receiving acoustical signals refracted from the formation.

4. A method as in claim 1, wherein the single stacked signal is stored in memory downhole.

5. A method as in claim 1, wherein the single stacked signal is used as an input to an automatic closed loop drilling system.

6. A method for obtaining standoff aligned acoustic signals, comprising:
   (a) firing an acoustic transducer mounted in a logging tool a plurality of times during an interval;
   (b) receiving reflected acoustic waves and determining standoff distance between the logging tool and borehole wall;
   (c) receiving acoustical signals from an acoustic logging sensor indicative of formation parameters;
   (d) determining an index value for each acoustical signal based on an associated standoff distance;
   (e) aligning the acoustical signals by shifting the acoustical signals based upon the indexed values.

7. A method as in claim 6, further comprising the step of:
   (f) stacking the standoff aligned acoustical signals to obtain a single acoustical value for the interval.

8. A method as in claim 7, further comprising the steps of
   (g) storing the single acoustical value in memory.

9. A method as in claim 7, further comprising the step of transmitting the single acoustical value to the surface of the well via mud pulse telemetry.

10. A method for compensating acoustical logging data obtained from a downhole acoustic logging tool located within a borehole, comprising:
   transmitting acoustic waves into the formation surrounding said borehole;
   receiving acoustic signals refracted by the formation and generating a signal representing the refracted acoustic waves;
   determining the standoff distance between the borehole wall and the logging tool; and
   aligning the refracted acoustic wave signals based upon the standoff distance.

11. A method as in claim 10, wherein the step of aligning the refracted acoustic wave signals includes shifting the refracted acoustic wave signals based on standoff distance.

12. A method as in claim 11, wherein the step of aligning the refracted acoustic wave signals includes assigning an index value to each refracted acoustic wave signal based upon the standoff distance associated with the refracted acoustic wave signal.

13. A method as in claim 12, wherein the mount of shifting of the refracted acoustic wave signal is determined by the index value.

14. A method as in claim 13, wherein the aligned refracted acoustic wave signals obtained during a sampling period are averaged to compute a single refracted acoustic wave signal for the sampling period.

15. A method as in claim 14, wherein the acoustic waves are transmitted into the formation in a rapid fire mode during the sampling period.

16. A method as in claim 15, wherein the acoustic waves are transmitted into the formation every 20 milliseconds during the sampling period.

17. A method as in claim 16, wherein the sampling period is approximately 200 milliseconds in duration.

18. A method as in claim 17, wherein an idle period of approximately 10 seconds follows a sampling period, during which time the refracted acoustic wave signals are aligned and averaged to produce a single refracted acoustic wave signal for each sampling period.

19. A method as in claim 18, further including the step of storing the averaged signal in memory downhole.

20. A method as in claim 18, wherein the averaged signal is used as an input to an automatic closed loop drilling system.

21. A method as in claim 10, wherein the refracted acoustic signals are rejected if the associated standoff distance exceeds a predetermined value.

22. A method for processing data gathered by an acoustical sensor array positioned within a borehole, comprising the steps of:
   generating acoustic signals at a first frequency range which are transmitted into the formation surrounding the borehole;
   receiving acoustic signals at the first frequency range that are refracted from the formation;
   generating acoustic signals at a second frequency range which are transmitted into the borehole;
   receiving acoustic signals at the second frequency range which are reflected from the borehole wall;
   calculating a standoff time between transmitting and receiving the acoustic signals at the second frequency range;
   aligning the received acoustic signals at the first frequency range based upon the standoff time.

23. A method as in claim 22, wherein said acoustic signals generated at the first frequency range have a frequency in the range of 8 kHz–20 kHz.

24. A tool as in claim 22, wherein the acoustic signals generated at the first frequency range have a frequency in the range of 10 kHz–15 kHz.

25. A tool as in claim 22, wherein said acoustic signals generated at the second frequency range have a frequency in the range of 100 kHz–350 kHz.

26. A tool as in claim 22, wherein said acoustic signals generated at the second frequency range have a frequency of approximately 250 kHz.

27. A tool as in claim 22, further comprising the step of averaging the standoff aligned acoustic signals to obtain a single acoustic signal.

* * * * *